G. D. ROSE.
METHOD OF BUILDING UP A RESILIENT TREAD OR TIRE.
APPLICATION FILED OCT. 15, 1910.

1,040,765.

Patented Oct. 8, 1912.

3 SHEETS—SHEET 1.

WITNESSES.

INVENTOR.
George D. Rose.
By

G. D. ROSE.
METHOD OF BUILDING UP A RESILIENT TREAD OR TIRE.
APPLICATION FILED OCT. 15, 1910.
1,040,765.
Patented Oct. 8, 1912.
3 SHEETS—SHEET 2.
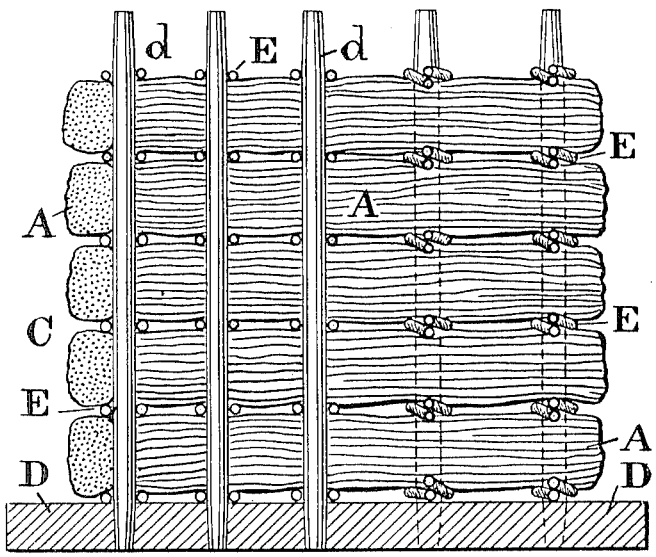
Fig. 6.
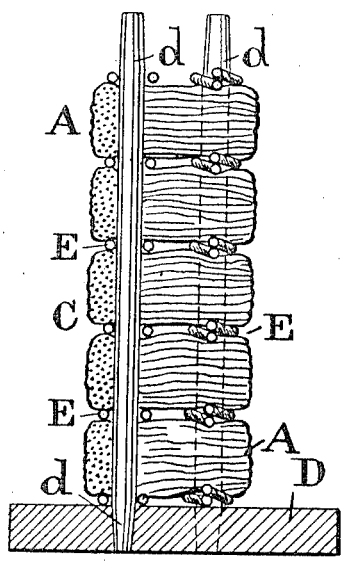
Fig. 2.
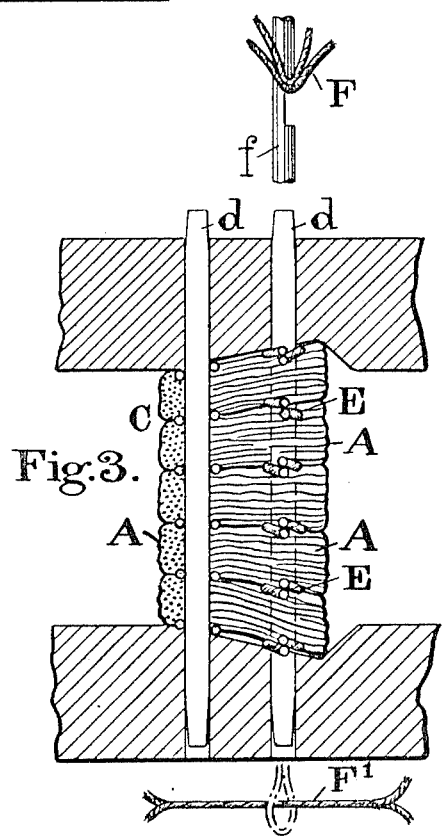
Fig. 3.
WITNESSES.
INVENTOR.
George D. Rose.
By James L. Norris G. D. ROSE.
METHOD OF BUILDING UP A RESILIENT TREAD OR TIRE.
APPLICATION FILED OCT. 15, 1910.

1,040,765.

Patented Oct. 8, 1912.
3 SHEETS—SHEET 3.

WITNESSES.

INVENTOR.
George D. Rose

UNITED STATES PATENT OFFICE.

GEORGE DAUBNEY ROSE, OF MANCHESTER, ENGLAND.

METHOD OF BUILDING UP A RESILIENT TREAD OR TIRE.

1,040,765.  Specification of Letters Patent.  Patented Oct. 8, 1912.

Application filed October 15, 1910. Serial No. 587,224.

*To all whom it may concern:*

Be it known that I, GEORGE DAUBNEY ROSE, a British subject, residing at Lower Broughton, Salford, Manchester, county of Lancaster, England, have invented certain new and useful Improvements in Methods of Building up a Resilient Tread or Tire, of which the following is a specification.

This invention relates to improvements in the manufacture of resilient tires—either pneumatic or solid—for the wheels of vehicles. These tires have been made in a great variety of ways with canvas and looped fabrics embedded in rubber to increase the wearing properties, such fabrics having been prepared from cotton, wool, flax, and coir fibers.

In carrying out this invention it is preferred to employ coir or cocoanut fiber though material prepared from any other fibers may be employed.

It consists essentially in building up a tread or tire of a number of laps or layers of rope or fabric comprising strands of coir or other fiber (or of strips of woven fabric) coated or saturated with rubber or rubber composition placed in continuous zig-zag formation over a number of pins and held in position by inextensible cords or equivalents interlaced circumferentially, the zig-zag loops or layers of material being highly compressed laterally to consolidate the mass and secured by transverse binding cords or equivalents inserted into the holes or spaces (from which the pins have been removed).

The invention will be fully described with reference to the accompanying drawings forming part of the specification.

Figure 1:
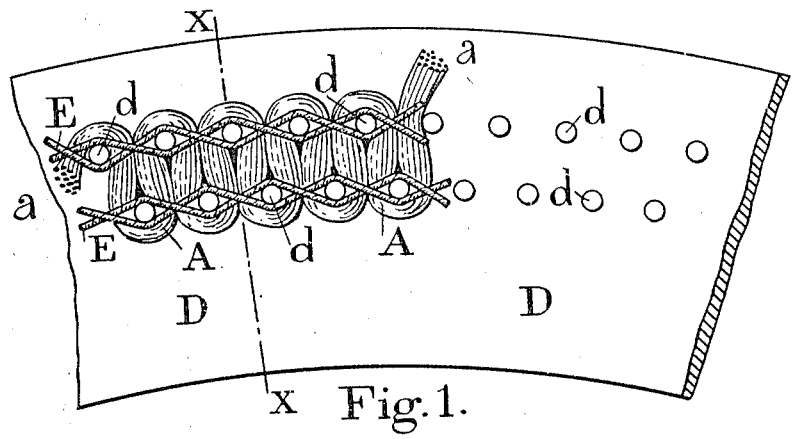
Figure 5:
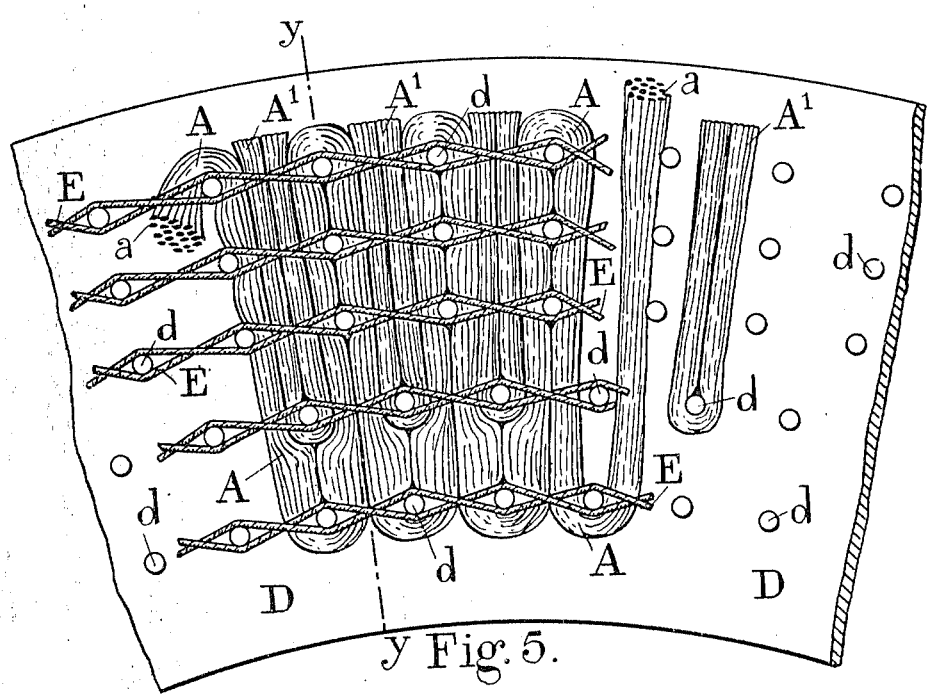
Figure 4:
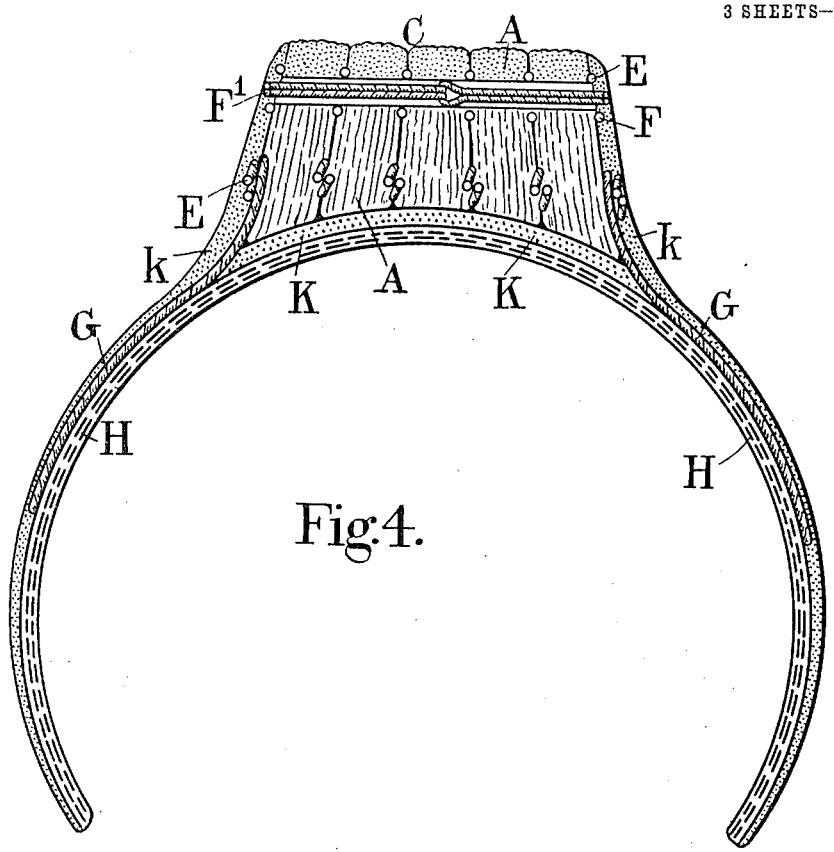
Figure 7:
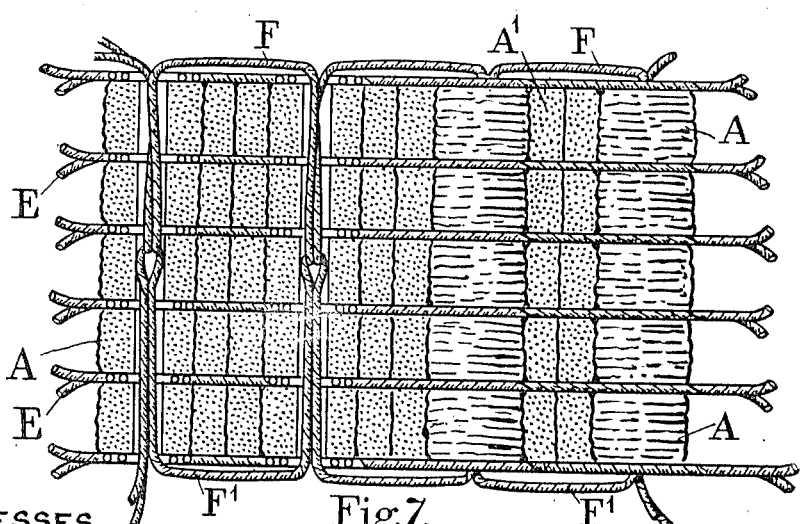

Figure 1 is a plan illustrating the method of building up the tread of a pneumatic tire. Fig. 2 is a transverse section taken on the line $x$—$x$ of Fig. 1. Fig. 3 is a transverse section of the tread showing the method of compressing the layers of fiber laterally. Fig. 4 is a transverse section of the finished tread for a pneumatic tire. Fig. 5 is a plan illustrating the method of building up a solid tire. Fig. 6 is a transverse section of same on line $y$—$y$ Fig. 5. Fig. 7 is a plan partly in section of either a solid tire or the tread of a pneumatic tire.

The coir or other fiber from which the tread or tire is to be built up is prepared in the form of yarns or strands and these are coated, saturated or impregnated with rubber or rubber composition or rubber substitute in any ordinary way such as by passing the strands through a trough or receptacle containing the prepared rubber or other solution. The yarns or strands thus prepared are bunched together or plaited or twisted into a rope or fabric A of suitable thickness and length. This may be pressed or flattened if desired but at present I find that the strands can be best employed by being first laid together and held by the adhesion of the rubber or other solution.

The fabric or rope thus prepared or a fabric prepared from two or more plies of canvas or other material woven solid and treated with rubber is employed to build up the tire or tire tread in the following manner. There is first constructed a frame of circular form comprising a metal or other plate D of suitable size with a number of pins $d$ projecting therefrom placed closely together and in two or more circles the space between the inside and outside circles varying according to the thickness of tread or tire required. This fabric or rope A is intertwined around the pins $d$ successively in continuous zig-zag formation until looped around the rings of pins into a complete hoop or ring the outer periphery C of which forms the tread of the tire. Two, three or more layers of the rope or fabric A are built up in this way one on top of or beside the other according to the width of the tire or tread, a coating of rubber or like solution being inserted between each layer. Between each layer of the rope or fabric A binding cords E or small ropes of hemp, cotton or other fiber are interwoven around both circles of pins and made inextensible and practically endless in any convenient manner. The binding cords E serve to take the stress or pull circumferentially around the tire to prevent any liability of the zig-zag loops or folds expanding or being drawn out of place.

In the case of solid tires which are much thicker than pneumatic, three, four or more rows of pins $d$ may be employed in the frame plate D and a corresponding number of binding cords E may be inserted between each layer of the rope or fabric A, see Fig. 6, and additional strands A′ are inserted to fill up the periphery.

When the tread or tire is completed, it, together with the pins $d$ is removed from the frame plate D and placed in a press (see Fig. 3) and the layer of rope or fabric A comprising the tire or tread are highly pressed together (in a direction lateral to the tire) to consolidate the fibers and the rubber with which they are impregnated into a solid homogeneous and compact structure. While thus held under pressure the pins $d$ are successively withdrawn and by means of a hooked needle $f$ or otherwise a lateral binding cord F is inserted in the holes or spaces from which the pins $d$ have been withdrawn and is connected by a lock stitch to a similar cord F' on the opposite side of the tire or tread. The lateral binding cords F F' lie at right angles to the binding cords E and securely bind together the several layers A of rope or fabric which go to build up the tire or tread. The binding cords F and F' are inserted after removal of the product in partially completed condition from the press, but before the material expands or springs outwardly, the fibers being held in their compressed state by the adhesive qualities of the rubber with which they are impregnated.

For the cords E, F and F' wire may be substituted.

The solid tire may be mounted on a base of rubber or other material or may be simply pressed into the shape required for the tire.

For treads for pneumatic tires as in Fig. 4 bunches or strands G may be secured by the binding cords E and extend down both sides to adhere to the canvas backing H of the tire and secure the tread firmly thereto and on the underside of the tread a layer or sheet K of rubber, canvas or other suitable material may be vulcanized thereto. Further a layer $k$ of rubber or canvas may be applied to both sides of the tread in the usual way. The whole tread or tire thus built up is vulcanized in a suitable mold or press in the ordinary way.

If preferred the tread or tire may be partially vulcanized while being compressed or before releasing the pressure after the insertion of the lateral binding cords F F' and the vulcanizing be completed at a second operation.

What I do claim as my invention and desire to protect by Letters Patent is:—

The method of building up a resilient tire or tread from strips of rubber-coated strands which consists in winding the said strips side by side in zigzag loops around a series of pins on a suitable frame, to produce a plurality of parallel layers, weaving and interlacing inextensible binding cords about said pins and between said layers, compressing and consolidating the layers by lateral pressure, withdrawing said pins, and inserting binding cords through the transverse openings produced by the withdrawal of the pins to secure said layers together.

In testimony whereof I have hereunto set my hand in presence of two subscribing witnesses.

GEORGE DAUBNEY ROSE.

Witnesses:
   I. OWDEN O'BRIEN,
   GEO. H. O'BRIEN.